Patented Aug. 3, 1943

2,325,675

UNITED STATES PATENT OFFICE 2,325,675

LIQUID TREATMENT

Hilding B. Gustafson, Chicago, Ill., assignor to Infilco Incorporated, Chicago, Ill., a corporation of Delaware No Drawing. Application February 10, 1941, Serial No. 378,251

10 Claims. (Cl. 210—24)

This invention relates to an improved method of water purification and of water softening.

One of the objects of this invention is to secure an efficient coagulation of colloids in alkaline waters.

A further object of this invention is to secure an efficient coagulation of suspended matter in alkaline waters.

Another of the objects of this invention is to provide an improved method for treating alkaline water by means of a coagulant to remove coloring matter, colloidal organic matter and suspended solids.

An additional object of the invention is to provide a means whereby an alkaline water can be readily and successfully treated with one of the usual coagulants which, as is well known, does not ordinarily form a satisfactory floc in such water.

A still further object of this invention is to provide a method whereby a coagulant such as filter alum can readily remove color, organic matter and suspended solids from alkaline water.

Other objects of the invention will be apparent from the specification and claims which follow.

The art of clarifying and purifying water by means of coagulation is well known but may be mentioned briefly in order to more accurately point out the scope of the present invention. A coagulant such as aluminum sulphate, ferric sulphate or ferrous sulphate is added to water and mixed therewith. The treated water is then permitted to settle for a time and is then filtered. The coagulant reacts with the water to form a gelatinous precipitate which collects the color, colloidal organic matter and suspended solids into aggregates large and heavy enough to be readily removed by settling and filtration, thereby clarifying and purifying the water. The reaction is typified by that between aluminum sulphate, commonly known as filter alum, and water containing calcium bicarbonate:

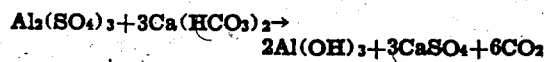

(The water of crystallization of the aluminum sulphate is not shown in this equation.)

It is well known that such coagulants are not satisfactory in highly alkaline water, and are especially ineffective in the case of alkaline clear, colored water. The treatment by this method is best carried on in a medium that is slightly acidic in character. The optimum pH is between 5.5 and 7.5 and for color removal sometimes should be as low as 4.8. When highly alkaline waters are treated, it is necessary to use very large amounts of the coagulant and even then the floc or gelatinous precipitate forms slowly, does not settle readily, is easily broken up and fails to remove much of the coloring matter. It has been known that the coagulation of alkaline waters can be improved by neutralizing a large part of the alkalinity of the raw water by the addition of sulphuric or hydrochloric acid. The acid treatment removes the alkalinity which prevents the formation of a satisfactory floc. However, there are many objectionable features to such a treatment, such as the fact that the mineral solids content of the water is increased above that of raw water, and the hardness of many waters is not reduced in any degree.

By means of my invention I am able to treat strongly alkaline waters with a coagulant without the direct use of an acid. I am able, by means of my invention, to form a floc with a minimum amount of the coagulant material, to form the floc rapidly, and to form a floc which settles quickly and resists dispersion to a high degree. In addition the mineral solids content is materially reduced, and the water is at least partially softened. It is evident therefore that by the use of my invention I am able to secure greatly improved clarifying and purifying action.

Briefly my invention comprises first treating raw water with a hydrogen exchange material, or as it is usually called "hydrogen zeolite," and subsequently treating the zeolite effluent with the coagulant. The use of a selective, or as it is commonly called "partially regenerated" hydrogen zeolite results in the removal bodily of carbonates and bicarbonates in solution. In the reaction the mineral cation, such as magnesium or calcium of the carbonates or bicarbonates in solution, is exchanged for the hydrogen cation of the zeolite, thereby forming the mineral zeolite and carbonic acid which, being unstable, may readily be decomposed into water and carbon dioxide. It is evident that in such treatment the hardness of the water is reduced to a greater or lesser degree; that the solids content of the water is reduced by the amount of carbonates and bicarbonates removed from solution; and most important, the alkalinity of the raw water is reduced by the formation of carbonic acid. When the regeneration of the hydrogen zeolite is properly controlled, only carbonic acid is formed—the chlorides and sulphates are not converted into hydrochloric or sulphuric acid, thereby avoiding a corrosive effluent.

Preferably, when a clear colored water is treated, the raw water may be passed directly through the zeolite bed. Ordinarily it is undesirable to pass turbid water through the zeolite bed, because of damage done thereby. When treating turbid water, it is preferable to mix raw water with a portion of previously clarified water which has been passed through the zeolite. The clarified water passing through the zeolite will have a maximum reduction of alkalinity so that when mixed with raw water the resultant mixture will have the optimum pH and alkalinity. The mixture is then treated with the coagulant, settled, filtered, and a portion of the clarified effluent bypassed through the zeolite bed to mix with incoming raw water.

After the zeolite treatment the coagulant is added and mixed with the effluent in the usual way, the water settled, filtered and aerated to remove the carbon dioxide resulting from the decomposition of the carbonic acid into water and carbon dioxide. Finally, a small quantity of lime or other alkaline reagent is added to render the water non-corrosive. It is of course understood that the amount of the various reagents used will depend upon the character of the raw water to be treated, and that the treatment above described can accurately be controlled by one skilled in the art.

An example of the advantages of my invention is shown in the following tests:

Test I

A sample of water having a total alkalinity of 390 parts per million, pH of 8.1, color of 230 parts per million and total solids of 438 parts per million was divided into two parts. One sample was used as a control and was treated with a coagulant. Five grains of filter alum per gallon failed completely as no floc formed. Additional quantities of filter alum were added to the water up to 15 grains per gallon, which likewise failed to produce a floc with the result that when the water was duly stirred, settled and filtered, it was practically as high in color as the raw water. With the addition of 20 grains of filter alum per gallon to this sample flocculation slowly occurred requiring considerable time for the treatment but eventually resulting in a filtrate with a color of 27 parts per million.

The other sample of this water was passed through a bed of hydrogen zeolite. The effluent from the zeolite treatment had an alkalinity varying from a minimum of 10 parts per million to a maximum of 30 parts per million throughout the run, and in addition the total solids content was reduced to 45 parts per million. The effluent was treated with 0.88 grains of hydrated lime and 5 grains of filter alum per gallon and stirred. In water so treated an excellent floc quickly developed which settled rapidly and was exceedingly difficult to disperse. The sample was then settled and filtered and had a color of 13 parts per million. After aeration followed by treatment with 0.13 grain of hydrated lime per gallon to render the water non-corrosive, the color had increased to 16 parts per million. However, it is evident that the color of the second treated sample was much better than that of the first and that only one-fourth as much coagulant was necessary to secure the superior results.

Test II

Another test was performed with water having an alkalinity of 126 parts per million, hardness of 135 parts per million, color of 116 parts per million and total solids of 143 parts per million. This water was divided into three samples. The first sample was treated with a minimum of 7 grains of filter alum per gallon before a satisfactory flocculation occurred. The water was then permitted to settle and was then filtered. The filtrate had an alkalinity of 78 parts per million, a hardness of 135 parts per million, color of 16 parts per million and a total solids content of 160 parts per million. It is evident that the treatment of this sample (which treatment is one of the two ways previously used for flocculation of such water) resulted in a slight decrease in alkalinity and in a reduction of the color. The hardness of the raw water remained the same and the total solids content was increased.

The second sample was first treated with 5.8 grains of sulphuric acid per gallon before addition of the coagulant. The amount of filter alum necessary to produce a satisfactory flocculation was thereby reduced to 3 grains per gallon. After flocculation the water was permitted to settle and then filtered as in the first sample. The filtrate had an alkalinity of 12 parts per million, a hardness of 135 parts per million, a color of 12 parts per million and a total solids content of 184 parts per million. It is evident that by this treatment (which is the other type of process heretofore used in the treatment of such water by means of a coagulant) the color and alkalinity were substantially reduced, the hardness remained the same and the total solids content was considerably increased over the method as shown in the first sample.

A third sample was first passed through a bed of partially regenerated, or selective, hydrogen zeolite, i. e. a bed of zeolite which has been regenerated with just enough acid to cause the removal of carbonates and bicarbonates without affecting the chlorides and sulphates in solution. With water treated by the partially regenerated hydrogen zeolite, 2 grains of filter alum per gallon were required to coagulate the effluent and after settling and filtering as in the preceding sample, the water had an alkalinity of 4 parts per million, a hardness of 28 parts per million, color of 15 parts per million and a total solids content of 40 parts per million. It is therefore evident that water treated by the method of my invention provides a treated water with a greatly reduced alkalinity, with greatly reduced hardness, greatly reduced total solids content, with a color reduction comparable to that of any heretofore known means, and that such reductions are secured by means of a greatly reduced quantity of the coagulant. It is further evident that, by means of my invention, it is possible to secure a greatly improved coagulation in alkaline waters.

The comparative results of old methods of treating alkaline water with a coagulant and by means of my invention is strikingly shown by this test. The results are tabulated for easy comparison (in which all figures are shown in parts per million):

| | Raw water | Coagulant alone | Acid + coagulant | Zeolite treatment + coagulant |
|---|---|---|---|---|
| Coagulant needed | | 7 | 3 | 2 |
| Alkalinity | 126 | 78 | 12 | 4 |
| Hardness | 135 | 135 | 135 | 28 |
| Change in hardness over raw water | | 0 | 0 | −107 |
| Color | 116 | 16 | 12 | 15 |
| Total solids | 143 | 160 | 184 | 40 |
| Change in total solids over raw water | | +17 | +41 | −103 |

It is therefore very apparent that by means of my invention I am able to secure a much superior effluent in all respects, and use less coagulant than was formerly necessary.

It will thus be seen that there are many advantages to the use of my invention in treating raw alkaline water: the amount of coagulant is substantially reduced and the efficiency of the coagulant is appreciably increased as the coagulant forms a more satisfactory floc more quickly; the total solids in solution are greatly reduced rather than increased as heretofore; and the hardness of the water may be substantially reduced, which is not the case in any prior treatment.

In some waters, particularly in those in which the characteristics such as hardness, turbidity, alkalinity, etc., may vary considerably, it is desirable to use a completely regenerated zeolite. "Completely regenerated" zeolite is one which is regenerated by an excess of acid without the use of brine, so that all sulphates and chlorides as well as carbonates are exchanged. Completely regenerated zeolite is therefore to be distinguished from "partially regenerated" zeolite to which the present application refers. "Partially regenerated" zeolite is one which is regenerated by both acid and brine, the amount of acid being just sufficient to remove the carbonates and bicarbonates from solution, and sufficient brine to regenerate the balance of the zeolite bed. Generally speaking completely regenerated zeolite is used only on water with variable characteristics, while water with uniform characteristics is usually and preferably treated with a partially regenerated zeolite. In treating such variable waters I prefer to treat only a part of the raw water with the completely regenerated zeolite and to then mix with a sufficient quantity of raw water to secure a satisfactory alkalinity for flocculation. This type of treatment will readily be understood by those familiar with the art.

In this application the term zeolite is used in its broad sense to mean any anion or cation exchange material. Zeolite is therefore intended to include carbonaceous material having such exchange properties although in some respects such material is not technically a zeolite. The term "hydrogen zeolite" is used in its ordinary meaning of a material, including carbonaceous, which has the property of exchanging hydrogen ions for the metallic ions such as calcium and magnesium or the alkali metals, such as sodium. It is well known in the art that such a zeolite can be made selective, i. e. it will remove the carbonates and bicarbonates by exchanging with the metallic ion in such salts, without reacting with the salts of strong acids, such as the sulphates or chlorides.

Manifestly many modifications and variations of the invention hereinbefore set forth may be made by persons skilled in the art without department from the spirit and scope hereof. Accordingly the appended claims are to be given an interpretation commensurate with the novelty herein described and as broad as may be permitted by prior art.

I claim:

1. The method of treating alkaline water comprising first treating the raw water with a hydrogen zeolite, subsequently adding a coagulant, and thereafter separating the water and coagulated solids.

2. The method of treating alkaline water comprising first treating the raw water with a hydrogen zeolite, subsequently treating the effluent water with a coagulant, filtering the effluent, aerating the effluent to remove carbon dioxide and finally treating the effluent with an alkaline reagent to neutralize the water.

3. The method of clarifying and softening alkaline hard water comprising first treating a portion of the raw water with a hydrogen zeolite, mixing the zeolite treated water with the remainder of the raw water, subsequently adding a coagulant, and thereafter separating the coagulated solids and the water.

4. The method of clarifying and softening alkaline hard water comprising first treating a portion of the water with a hydrogen zeolite, mixing the zeolite treated portion of the water and raw water, subsequently adding filter alum to the mixture of zeolite treated and raw water, and thereafter separating the coagulated solids and the water.

5. The method of clarifying and softening alkaline hard water comprising first treating at least a portion of the raw water with a hydrogen zeolite, subsequently adding a coagulant, filtering the mixture of effluent and coagulant, aerating the effluent and finally treating with an alkaline reagent to neutralize the water.

6. The method of treating alkaline water comprising first reducing the pH of the raw water to between 4.8 and 7.5 by treatment with a hydrogen zeolite, subsequently adding a coagulant, and thereafter separating the water and the coagulated solids.

7. The method of clarifying and softening alkaline hard water comprising first reducing the pH of the raw water to between 4.8 and 7.5 by treatment with a hydrogen zeolite, subsequently adding a coagulant, and thereafter separating the water and the coagulated solids.

8. The method of clarifying and softening alkaline hard water comprising first reducing the pH of the raw water to between 4.8 and 7.5 by treatment with a hydrogen zeolite, subsequently adding filter alum, and thereafter separating the water and the coagulated solids.

9. The method of treating alkaline water comprising the steps of treating a sufficient portion of the raw water with a hydrogen zeolite to secure a mixed water of a pH of between 4.8 and 7.5 upon mixing with the balance of the raw water, mixing the zeolite treated water with the balance of the raw water, adding a coagulant to the mixed water, and separating the coagulated solids from the water.

10. The method of treating alkaline water comprising the steps of treating a sufficient portion of previously treated water with a hydrogen zeolite to secure a mixed water of a pH between 4.8 and 7.5 upon mixing with the water to be treated, mixing the zeolite treated water with water to be treated, adding a coagulant to the mixed water, and separating the coagulated solids from the water.

HILDING B. GUSTAFSON.